(12) United States Patent
Park et al.

(10) Patent No.: US 11,836,588 B2
(45) Date of Patent: *Dec. 5, 2023

(54) IMAGE GENERATING DEVICE USING LIGHTING CONTROL

(71) Applicant: XPERIX INC., Seongnam-si (KR)

(72) Inventors: Su Yoel Park, Seoul (KR); Byung Dai Hyun, Anyang-si (KR); Byoung Joon Jang, Seongnam-si (KR); Jae Eun Jo, Yongin-si (KR); Bo Gun Park, Seongnam-si (KR); Sang Won Lee, Anyang-si (KR)

(73) Assignee: XPERIX INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,561

(22) Filed: Dec. 12, 2022

(65) Prior Publication Data

US 2023/0110934 A1  Apr. 13, 2023

Related U.S. Application Data

(63) Continuation of application No. 17/393,023, filed on Aug. 3, 2021, now Pat. No. 11,546,522.

(30) Foreign Application Priority Data

Aug. 11, 2020  (KR) .................. 10-2020-0100698

(51) Int. Cl.
  *H04N 23/50*  (2023.01)
  *G06N 20/00*  (2019.01)
  (Continued)

(52) U.S. Cl.
  CPC ........... *G06N 20/00* (2019.01); *G06F 3/0484* (2013.01); *G06Q 30/0201* (2013.01); *H04N 23/56* (2023.01)

(58) Field of Classification Search
  CPC ................... H04N 23/56; H04N 1/024–0318
  (Continued)

(56) References Cited

U.S. PATENT DOCUMENTS

| 7,991,281 B1 | 8/2011 | Majewicz |
| 8,448,862 B2 | 5/2013 | Powell |

(Continued)

FOREIGN PATENT DOCUMENTS

| JP | 2003-189064 A | 7/2003 |
| KR | 10-2013-0120885 A | 11/2013 |

(Continued)

OTHER PUBLICATIONS

Kroean office Action dated Jan. 14, 2022 as received in Patent Application No. 10-2020-0100698.

(Continued)

*Primary Examiner* — Anthony J Daniels
(74) *Attorney, Agent, or Firm* — Maschoff Brennan

(57) ABSTRACT

An image generating device includes a support unit configured to support an object, an irradiation unit configured to irradiate the object disposed on the support unit with light, a light receiving unit configured to receive light returning from the object disposed on the support unit, and a control unit configured to generate a light irradiation signal for controlling the irradiation unit and a light-receiving region driving signal for controlling the light receiving unit, wherein the irradiation unit includes a first irradiation unit for irradiating a first region of the object with light and a second irradiation unit for irradiating a second region of the object with light, the light receiving unit includes a first light-receiving region and a second light-receiving region, the first light-receiving region and the second light-receiving region each include a plurality of pixels and are disposed at different positions on the light receiving unit.

11 Claims, 17 Drawing Sheets

(51) Int. Cl.
*G06F 3/0484* (2022.01)
*G06Q 30/0201* (2023.01)
*H04N 23/56* (2023.01)

(58) Field of Classification Search
USPC .................................................. 348/370, 371
See application file for complete search history.

(56) References Cited

U.S. PATENT DOCUMENTS

| | | |
|---|---|---|
| 9,892,299 B1 | 2/2018 | Giebel |
| 10,735,662 B2 | 8/2020 | Kobayashi |
| 2005/0178950 A1* | 8/2005 | Yoshida ............... H04N 25/531 |
| | | 348/E3.019 |
| 2009/0147120 A1 | 6/2009 | Kurane |
| 2014/0002723 A1 | 1/2014 | Cook |
| 2020/0288965 A1 | 9/2020 | Gamliel |
| 2021/0266435 A1* | 8/2021 | Katsuki .................. G03B 15/05 |

FOREIGN PATENT DOCUMENTS

| | | | |
|---|---|---|---|
| KR | 10-2016-0039378 A | 4/2016 |
| KR | 10-2017-0050059 A | 5/2017 |
| KR | 10-2017-0088273 A | 8/2017 |

OTHER PUBLICATIONS

European Search Report dated Jan. 17, 2022 as received in Patent Application No. 21185943.4.
KR Decision to Grant dated Apr. 21, 2022 as received in Application No. 10-2020-0100698.

* cited by examiner

O

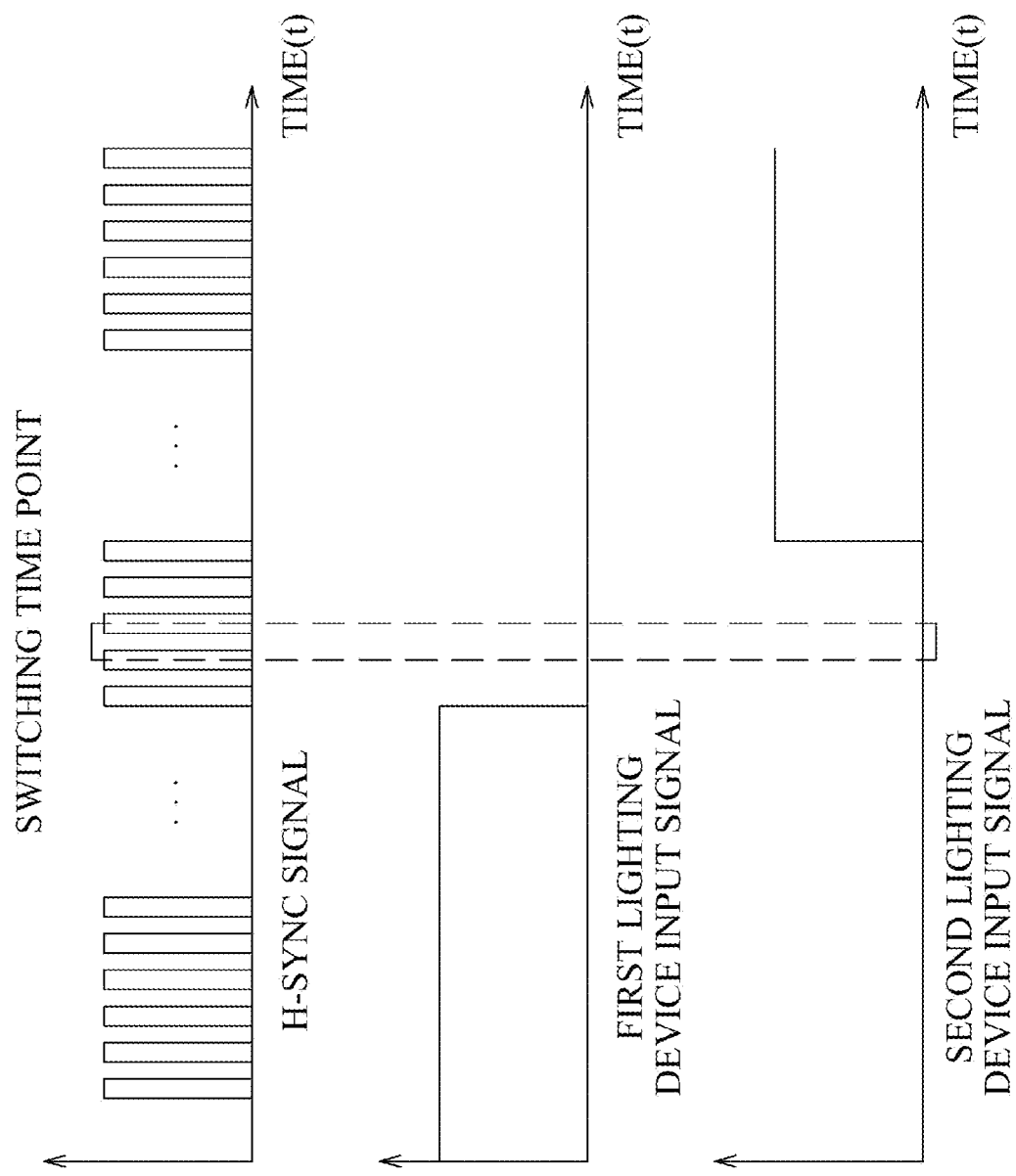

IMAGE GENERATING DEVICE USING LIGHTING CONTROL

CROSS-REFERENCE TO RELATED APPLICATION

This application claims priority to and the benefit of Korean Patent Application No. 10-2020-0100698, filed on Aug. 11, 2020, the disclosure of which is incorporated herein by reference in its entirety.

BACKGROUND

1. Field of the Invention

Embodiments of the present invention relate to an image generating device using lighting control, and more particularly, to an image generating device using lighting control in which, when the image generating device acquires an image of an object, by adjusting the operation of a plurality of lighting devices according to a time at which a sensor is operated, an image of the object, in which a light saturated region is not generated, is acquired.

2. Discussion of Related Art

In order to acquire an image of an object, an image sensor such as a complementary metal-oxide semiconductor (CMOS) or charge-coupled device (CCD) sensor is used for receiving light returned from the object and the light is imaged. Recently, in terms of acquiring an image of an object using a CMOS sensor, a rolling shutter method, which is an image acquisition method using the CMOS sensor, has been mainly adopted and used.

Meanwhile, in the case of companies that produce image generating devices that acquire an image of a unit, through which personal information can be identified, such as a passport, a resident registration, or a fingerprint, techniques are being developed in which images of objects are acquired using a CMOS image sensor instead of an expensive CCD sensor and light having different wavelengths for each region is used or images of several objects are acquired and then synthesized in order to avoid a light saturation phenomenon occurring in a region where the personal information is identified.

However, in order to acquire the images as described above, it is necessary to use light having multiple wavelengths or to additionally synthesize multiple images after acquiring the multiple images, and thus there is a need for a procedure or device for acquiring an image at one time so that there is no light saturated region among images of an object.

SUMMARY OF THE INVENTION

The present invention is directed to providing an image generating device using lighting control that prevents a light saturated region from being generated so that light intensity values of an acquired image of an object are substantially constant.

The present invention is also directed to providing an image generating device using lighting control that post-processes an image of an object so that light intensity values of the acquired image of the object are substantially constant.

Objects of the present invention are not limited to the above-described objects and other unmentioned objects may be clearly understood by those skilled in the art from this specification and the accompanying drawings.

According to an aspect of the present invention, there is provided an image generating device including a support unit configured to support an object, an irradiation unit configured to irradiate the object disposed on the support unit with light, a light receiving unit configured to receive light returning from the object disposed on the support unit, and a control unit configured to generate a light irradiation signal for controlling the irradiation unit and a light-receiving region driving signal for controlling the light receiving unit. The irradiation unit includes a first irradiation unit for irradiating a first region of the object with light and a second irradiation unit for irradiating a second region of the object with light. The light receiving unit includes a first light-receiving region and a second light-receiving region. The first light-receiving region and the second light-receiving region each include a plurality of pixels and are disposed at different positions on the light receiving unit. The light irradiation signal includes a first light irradiation signal for controlling the first irradiation unit and a second light irradiation signal for controlling the second irradiation unit. The light-receiving region driving signal includes a first light-receiving region driving signal for driving the first light-receiving region and a second light-receiving region driving signal for driving the second light-receiving region. The control unit is configured to generate the first light irradiation signal and the first light-receiving region driving signal such that the first light receiving unit operates relating to the first light irradiation unit, and generate the second light irradiation signal and the second light-receiving region driving signal such that the second receiving unit operates relating to the second light irradiation unit so as to prevent a light saturation phenomenon from occurring in the light receiving unit caused by the driving of the irradiation unit.

According to another aspect of the present invention, there is provided an image generating method including supporting, by a support unit, an object, irradiating, by an irradiation unit, the object disposed on the support unit with light, receiving, by a light receiving unit, light returning from the object disposed on the support unit, and generating, by a control unit, a light irradiation signal for controlling the irradiation unit and a light-receiving region driving signal for controlling the light receiving unit. The irradiation unit includes a first irradiation unit for irradiating a first region of the object with light and a second irradiation unit for irradiating a second region of the object with light. The light receiving unit includes a first light-receiving region and a second light-receiving region. The first light-receiving region and the second light-receiving region each include a plurality of pixels and are disposed at different positions on the light receiving unit. The light irradiation signal includes a first light irradiation signal for controlling the first irradiation unit and a second light irradiation signal for controlling the second irradiation unit. The light-receiving region driving signal includes a first light-receiving region driving signal for driving the first light-receiving region and a second light-receiving region driving signal for driving the second light-receiving region. The control unit is configured to generate the first light irradiation signal and the first light-receiving region driving signal such that the first light receiving unit operates relating to the first light irradiation unit, and generate the second light irradiation signal and the second light-receiving region driving signal such that the second receiving unit operates relating to the second light irradiation unit so as to prevent a light saturation phenomenon from occurring in the light receiving unit caused by the driving of the irradiation unit.

Solutions of the present invention are not limited to the above-described solutions and other unmentioned solutions may be clearly understood by those skilled in the art from this specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 12 is a diagram illustrating that, in the correlation between the H-sync signal input to the sensor unit (140) and the signal input to the lighting unit (120), the H-sync signal is input but there is no signal which is input to the lighting unit (120) near a switching time point (ST) according to an embodiment;

DETAILED DESCRIPTION OF EXEMPLARY EMBODIMENTS

Figure 1:
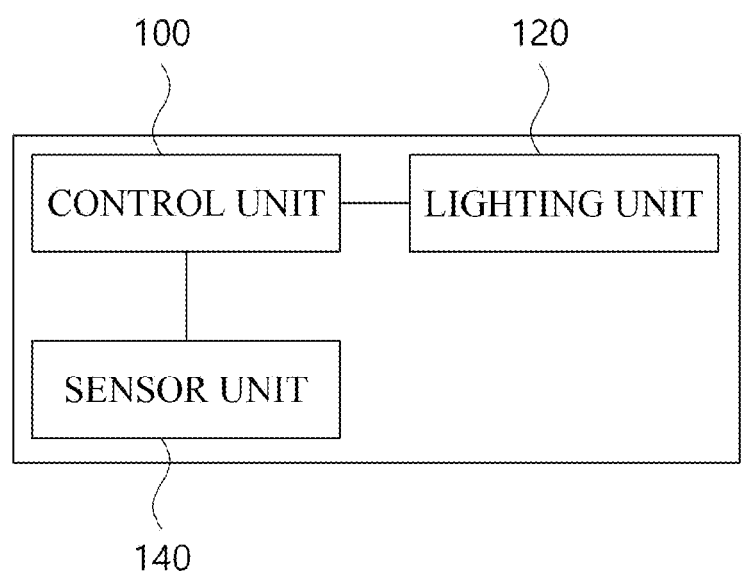
FIG. 1 is a schematic diagram illustrating a configuration of an image scanning device according to an embodiment.

The above-described objects, features and advantages of the present invention will be clearly understood through the following detailed description associated with the accompanying drawings. However, while the present invention may have various modifications and alternative forms, specific embodiments thereof are shown by way of example in the accompanying drawings and will be described in detail herein.

In the drawings, thicknesses of layers and regions are exaggerated for clarity. In addition, when an element or layer is referred to as being disposed "on" another element or layer, the layer may be directly formed on another element or layer, or a third element or layer may be interposed therebetween. Like reference numerals refer to like elements throughout this specification. Further, elements having the same function within the scope of the same concept shown in the drawings of each embodiment will be described using the same reference numerals.

When it is determined that detailed descriptions of related well-known functions or configurations may unnecessarily obscure the gist of the present invention, detailed descriptions thereof will be omitted. Further, the numbers (for example, first, second, etc.) used in description of the specification are used only to distinguish one element from another element.

Further, a suffix "module," "unit," "part," or "portion" of an element used herein is assigned or incorporated for convenience of specification description, and the suffix itself does not have a distinguished meaning or function.

1 Image Scanning Device Generals 1.1 Overview

FIG. 1 is a schematic diagram illustrating a configuration of an image scanning device according to an embodiment.

Referring to FIG. 1, the image scanning device may include a control unit 100, a lighting unit 120, and a sensor unit 140.

Although not illustrated in the drawing, the image scanning device may further include a support unit capable of supporting an object. Here, the support unit may include a transparent material to allow light to pass therethrough. In this case, the transparent material may be a material including an optical material exhibiting a property of refracting light, such as glass or a lens.

Further, the control unit 100, the lighting unit 120, and the sensor unit 140 are functional units that perform specific functions in the image scanning device, and the control unit 100 may be configured to photograph the object together with the sensor unit 140 or may independently perform a function. Similarly, the control unit 100 may be configured to irradiate the object with light together with the lighting unit 120. In other words, the control unit 100 may be an independent component or may be configured by being combined with the lighting unit 120 or the sensor unit 140. Hereinafter, for convenience of description, the control unit 100, the lighting unit 120, or the sensor unit 140 will be described as a functional unit that performs a specific function.

The control unit 100 may generate a signal that causes the sensor unit 140 to detect light. Further, the control unit 100 may generate a signal that causes the lighting unit 120 to irradiate light. Here, the signal generated by the control unit 100 may be a clock signal. In order to drive the lighting unit 120 or the sensor unit 140, the lighting unit 120 or the sensor unit 140 may be driven when the input of a clock signal starts or may be driven when the input of the clock signal is terminated.

The lighting unit 120 may apply light to an object O. Here, the applied light may be applied directly toward the object O, but the present invention is not limited thereto, and the applied light may be applied to the object O through a mirror surface or a lens surface. Further, the lighting unit 120 may apply the light onto the support unit by which the object O is supported.

The lighting unit 120 may irradiate the object O with light including light having a wavelength of an infrared (IR) ray, light having a wavelength of visible light including red, green, and blue (RGB) signals, or light having a wavelength in the ultraviolet (UV) range as a type of light to be used.

The sensor unit 140 may detect or collect light returning from the object O. In other words, the sensor unit 140 may detect or collect a light intensity value for each pixel used for generating an image. That is, the sensor unit 140 may perform a function of detecting light such as the light receiving unit, or may perform a function of collecting light such as the collecting unit. For example, the sensor unit 140 may be a complementary metal-oxide semiconductor (CMOS) or charge-coupled device (CCD) sensor for acquiring a light intensity value for each pixel.

The sensor unit 140 may use a global shutter method or a rolling shutter method as a method of acquiring the light returning from the object O. Here, the global shutter method refers to a method in which all light intensity values are acquired at once in light intensity value acquisition regions of the sensor unit 140. Further, the rolling shutter method refers to a method in which light intensity values are acquired in a light intensity value acquisition region present in the sensor unit 140, wherein the light intensity values are acquired with a predetermined time difference for each light intensity value acquisition region.

Specifically, in the rolling shutter method, the image sensor may have a plurality of lines having a plurality of light intensity value acquisition regions. In this case, when a signal for generating an image is input to the sensor unit 140, the sensor unit 140 may sequentially acquire intensity values of light returning from the object O from the first line to the last line of the plurality of lines. A description thereof will be given in detail in the related parts below.

Further, in this case, the intensity values of the light returning from the object O may be acquired in some regions of the sensor unit 140. In this case, the regions may include one line or a plurality of lines but, hereinafter, for convenience of description, the regions are also expressed as lines.

The light intensity values acquired by the sensor unit 140 may refer to the intensity of optical signals including black-and-white signals, YUV signals, IR ray signals, UV light signals, and RGB signals related to visible light signals.

Further, the light intensity values acquired by the sensor unit 140 may be used for generating an image of an object. Hereinafter, the sensor unit will be described as acquiring the intensity values of the light returning from the object or acquiring the image of the object. This means that a function in which the sensor unit acquires the intensity value of the light is not different from a function in which the sensor unit acquires the image. Hereinafter, for convenience of description, the function in which the sensor unit acquires the intensity value of the light and the function in which the sensor unit acquires the image may be described interchangeably.

The light intensity value acquisition region existing in the sensor unit 140 may include a plurality of pixels, and in the case of a three-dimensional (3D) image sensor, the light intensity value acquisition region may include a plurality of voxels. Hereinafter, the light intensity value acquisition region existing n the sensor unit 140 will be described as pixels.

Hereinafter, each functional unit of the image scanning device will be described in detail with reference to the accompanying drawings.

1.2 Signal Generation of the Control Unit 100

The control unit 100 may generate a signal that causes the sensor unit 140 to detect light. Further, the control unit 100 may generate a signal that causes the lighting unit 120 to be driven.

Figure 2A:
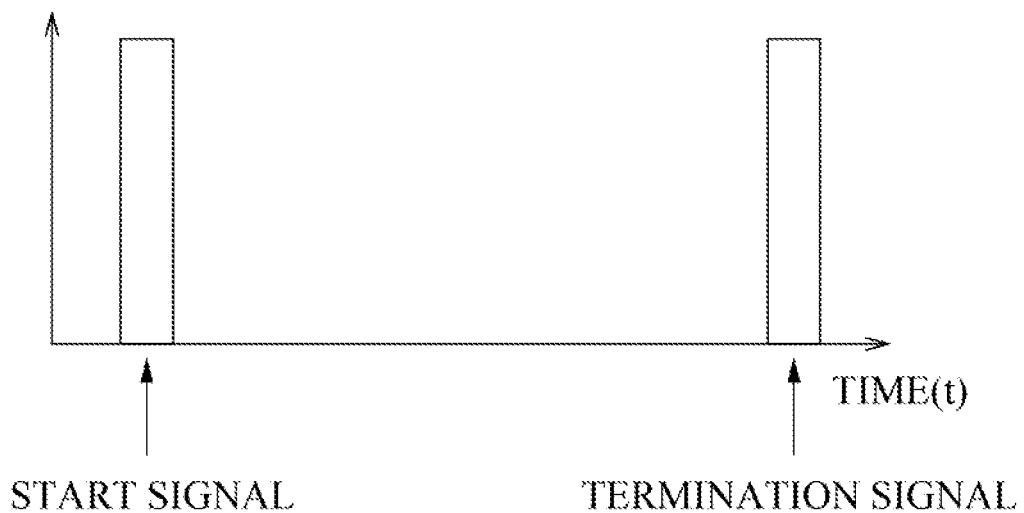
FIG. 2A shows a V-sync signal generated by a control unit (100) according to an embodiment.
Figure 2B:
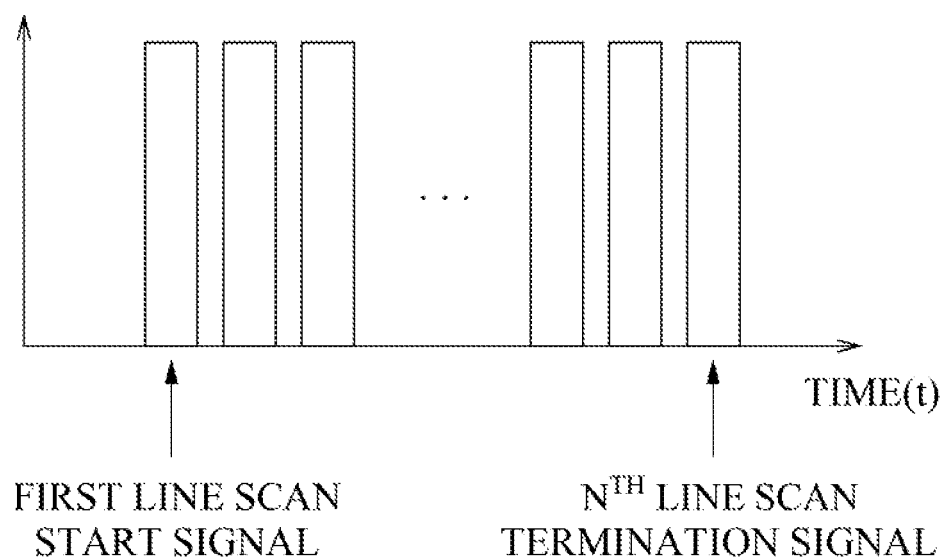
FIG. 2B shows an H-sync signal generated by the control unit (100) according to the embodiment.

FIG. 2A shows a V-sync signal generated by the control unit 100 according to an embodiment, and FIG. 2B shows an H-sync signal generated by the control unit 100 according to the embodiment.

Referring to FIG. 2A, a signal input to the sensor unit 140 by the control unit 100 is illustrated. Here, the signal input to the sensor unit 140 by the control unit 100 may be used for acquiring the light intensity value using a rolling shutter method.

The signal illustrated in FIG. 2A may be a signal input to the sensor unit 140 by the control unit 100 to start or terminate acquiring of the light intensity value. The signal for starting or terminating the acquisition of the light intensity value may be a signal including V-sync. Hereinafter, for convenience of description, the signal that causes the sensor unit 140 to start or terminate acquiring of the light intensity value will be described as a V-sync signal.

Here, the V-sync signal may be a signal that causes the sensor unit 140 to start or terminate acquiring the light intensity value. That is, when a start signal, which is a V-sync signal, is input to the sensor unit 140, the sensor unit 140 may start to acquire the light intensity value, and when a termination signal is input to the sensor unit 140, the sensor unit 140 may terminate the acquisition of the light intensity value.

The signal illustrated in FIG. 2B may be a signal input to the sensor unit 140 by the control unit 100 to start acquiring the light intensity value for each line of the sensor unit 140. The signal for starting the acquisition of the light intensity value for each line of the sensor unit 140 may be a signal including H-sync. Hereinafter, for convenience of description, the signal for starting the acquisition of the light intensity value for each line of the sensor unit 140 will be described as an H-sync signal.

Here, the signal for starting the acquisition of the light intensity value for each line may be expressed as a light-receiving region driving signal, a line scan signal, a region light receiving signal, or the like, but the present invention is not limited thereto, and any expression having the meaning of a signal for starting the acquisition of the light intensity value on the sensor unit 140 may be used.

In this case, the sensor unit 140 may include lines including a first line 320 to an $n^{th}$ line 340. Further, the H-sync signal may include a first line scan start signal to an $n^{th}$ line scan start signal in order to perform a scan for each line of the sensor unit 140.

Here, when a start signal of the V-sync signal is input to the sensor unit 140, the first line scan start signal to the $n^{th}$ line scan start signal of the H-sync signal may be input to the sensor unit 140. After the $n^{th}$ line scan start signal of the H-sync signal is input to the sensor unit 140, a termination signal of the V-sync signal may be input to the sensor unit 140. A detailed description thereof will be given below with reference to FIG. 3.

Figure 3:
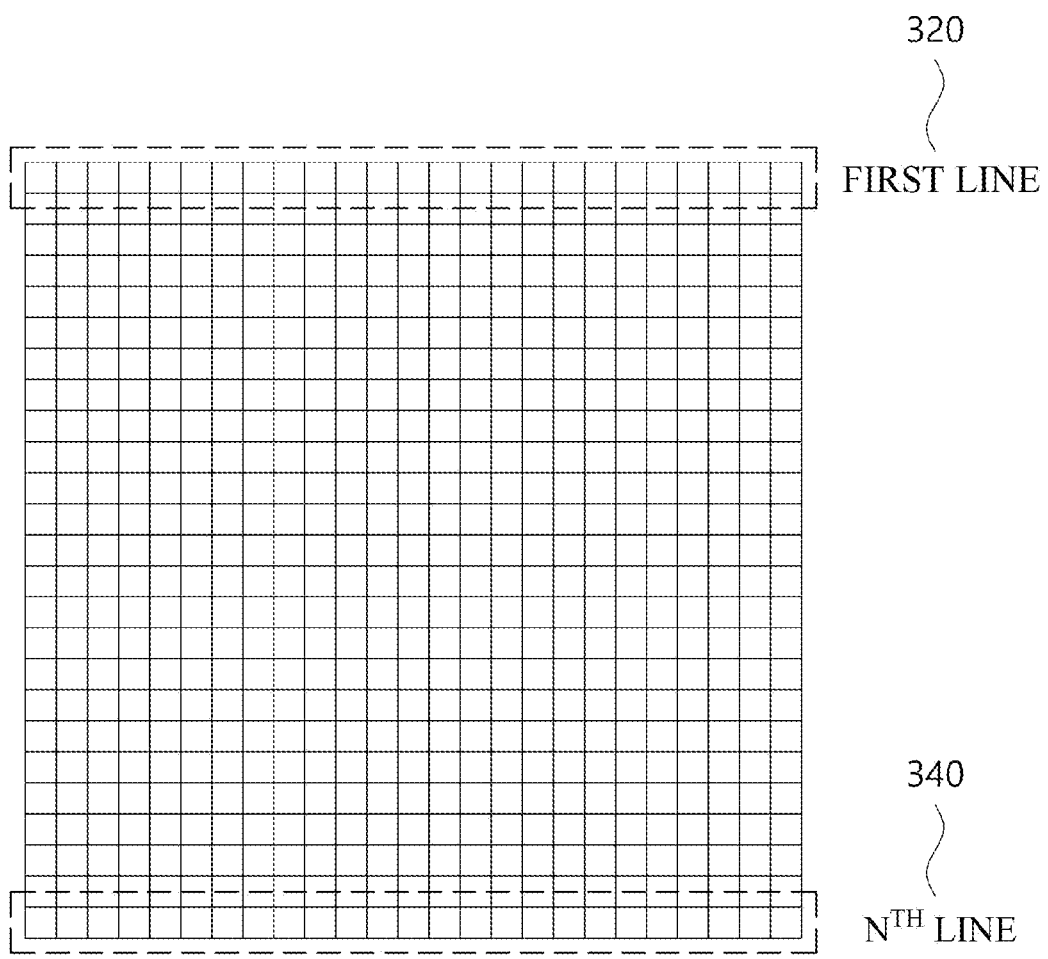
FIG. 3 is a diagram illustrating all pixels of a sensor unit (140) according to an embodiment.

FIG. 3 is a diagram illustrating all pixels of the sensor unit 140 according to an embodiment.

Referring to FIG. 3, a plurality of pixels may be provided. A light intensity value may be acquired from each of the plurality of pixels.

Referring to FIG. 3, when the start signal of the V-sync signal generated by the control unit 100 is input to the sensor unit 140, the sensor unit 140 may start to acquire the light intensity value. After the start signal of the V-sync signal is input to the sensor unit 140, the control unit 100 may input the H-sync signal to the sensor unit 140. For example, when the H-sync signal is input to the sensor unit 140, light intensity values may be acquired from pixels of each line located on the sensor unit 140.

More specifically, when the first line scan start signal of the H-sync signal is input to the sensor unit 140, the sensor unit 140 may acquire light intensity values from pixels of the first line 320. After the first line scan start signal is input to the sensor unit 140, a second line scan start signal to the $n^{th}$ line scan start signal may be sequentially input to the sensor unit 140. When the line scan start signals are sequentially input to the sensor unit 140, the sensor unit 140 may acquire light intensity values from pixels of each line from the first line 320 to the $n^{th}$ line 340.

In this case, when the $n^{th}$ line scan start signal of the H-sync signal is input to the sensor unit 140, and the pixels of the $n^{th}$ line 340 of the sensor unit 140 acquires the light intensity values, the control unit 100 may input the termination signal of the V-sync signal to the sensor unit 140. When the termination signal of the V-sync signal is input to the sensor unit 140, the sensor unit 140 may terminate the acquisition of the intensity value of the light returning from the object O.

That is, in other words, when the start signal of the V-sync signal is input to the sensor unit 140, the H-sync signal may be input to the pixels for each line of the sensor unit 140 so that the intensity value of the light returning from the object O may be acquired, and when the acquisition of the light intensity values for all of the lines is terminated, the termination signal of the V-sync signal may be input to the sensor unit 140 so that the sensor unit 140 may terminate the acquisition of the light intensity values for each line.

The resolution of the image acquired by the sensor unit 140 using the light returning from the object O may include a resolution of 1280×720, 1920×1080, and 2180×1770, but the present invention is not limited thereto, and images having various resolutions may be acquired based on the number of pixels that the sensor unit 140 may have.

1.3 Light irradiation of the lighting unit 120

FIGS. 4A, 4B, 5A, and 5B are schematic diagrams illustrating image scanning devices according to embodiments when viewed from the above.

Figure 4A:
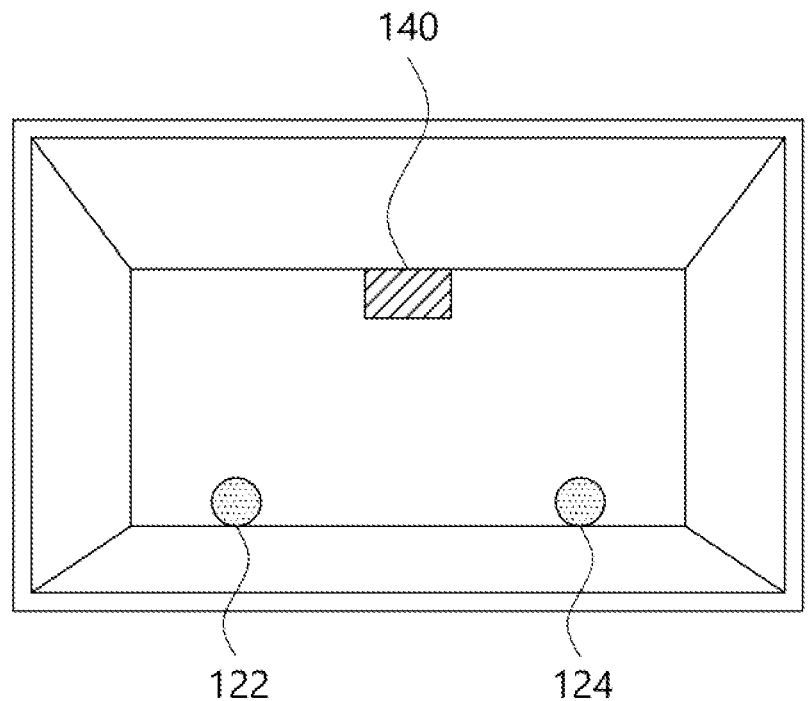
FIGS. 4A, 4B, 5A, and 5B are schematic diagrams illustrating image scanning devices according to embodiments when viewed from the above.
Figure 4B:
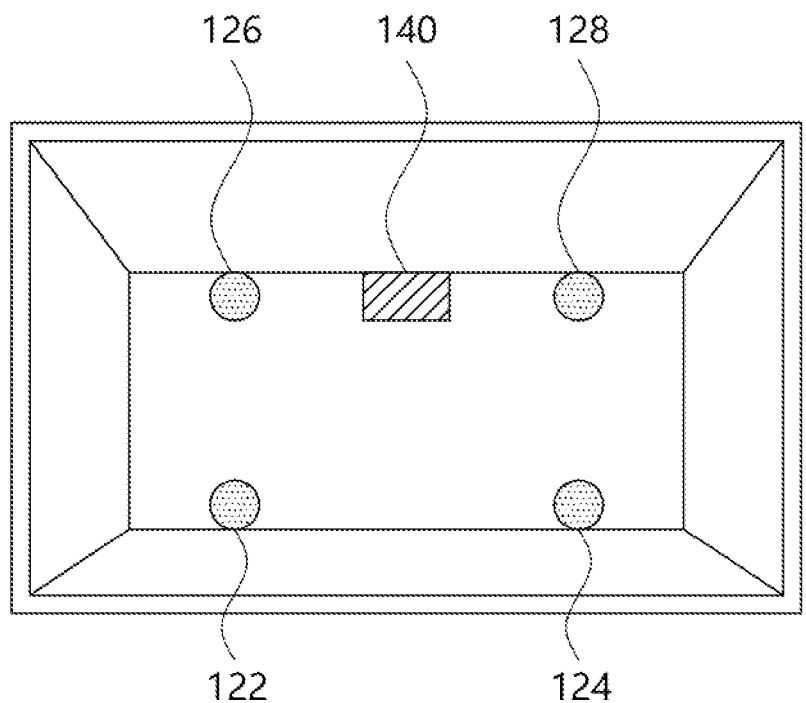

Referring to FIGS. 4A and 4B, the image scanning devices may include one sensor unit 140 and a plurality of lighting units 120.

In order to apply light to an object O, the lighting units 120 may include a plurality of lighting devices.

Here, the sensor unit 140 may be disposed at the center of the image scanning device or at the center of the object O in order to symmetrically acquire light returning from the object O.

Referring to FIG. 4A, according to an embodiment, the lighting units 120 of the image scanning device may include a first lighting device 122 and a second lighting device 124. The first lighting device 122 and the second lighting device 124 may be present at positions symmetrical to each other with respect to the sensor unit 140. That is, the first lighting device 122 and the second lighting device 124 may irradiate opposite side surfaces of the object O with respect to the sensor unit 140 with light.

In other words, the positions of the first lighting device 122 and the second lighting device 124 may be determined based on the position of the sensor unit 140.

Referring to FIG. 4B, according to another embodiment, the image scanning device may include a plurality of lighting devices that are symmetrical to each other with respect to the sensor unit 140. For example, referring to FIG. 4B, the lighting units 120 may include a first lighting device 122 to a fourth lighting device 128. Further, the first lighting device 122 and the third lighting device 126 may irradiate the same side surface of the object O with light, and the second lighting device 124 and the fourth lighting device 128 may also irradiate the same side surface of the object O with light. Here, since the first lighting device 122 and the third lighting device 126 may irradiate one side surface of the object O with the light and the second lighting device 124 and the fourth lighting device 128 may irradiate another side surface of the object O with the light, the first lighting device 122 and the third lighting device 126 may correspond to one lighting unit 120, and the second lighting device 124 and the fourth lighting device 128 may also correspond to one lighting unit 120. In other words, when regions where light is irradiated to the object O coincide with each other with respect to the sensor unit 140, the plurality of lighting devices may correspond to one lighting unit 120.

Figure 5A:
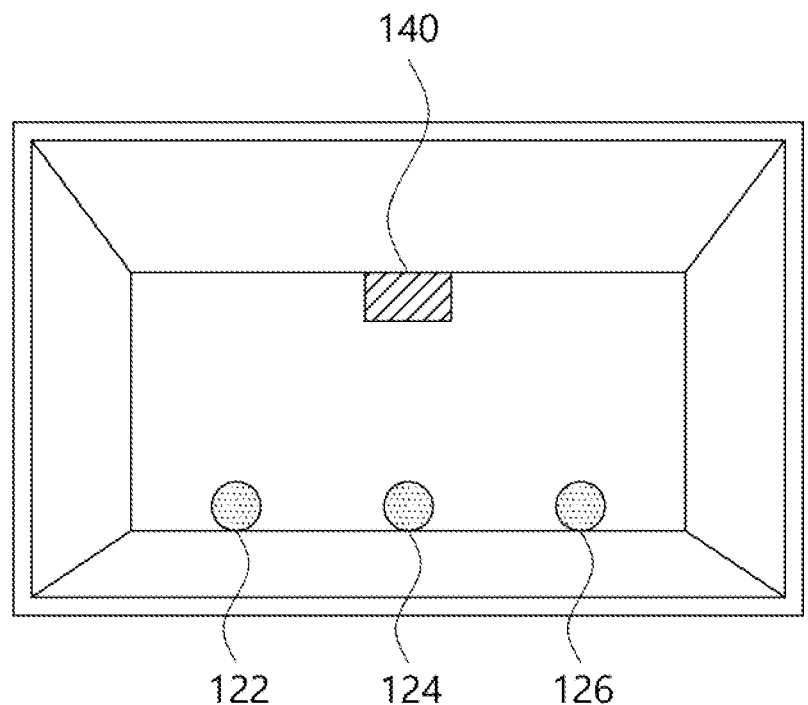

Referring to FIG. 5A, according to still another embodiment, the lighting units 120 may include a plurality of lighting devices in order to apply light to a plurality of regions of the object O. For example, referring to FIG. 5A, the lighting devices may be bilaterally symmetrically disposed with respect to the sensor unit 140 in order to apply light to the object 0. However, the number of lighting devices illustrated in FIG. 5A is not limited, and the plurality of lighting devices may be disposed inside the image scanning device so as to be bilaterally symmetrical to each other with respect to the sensor unit 140.

Figure 5B:
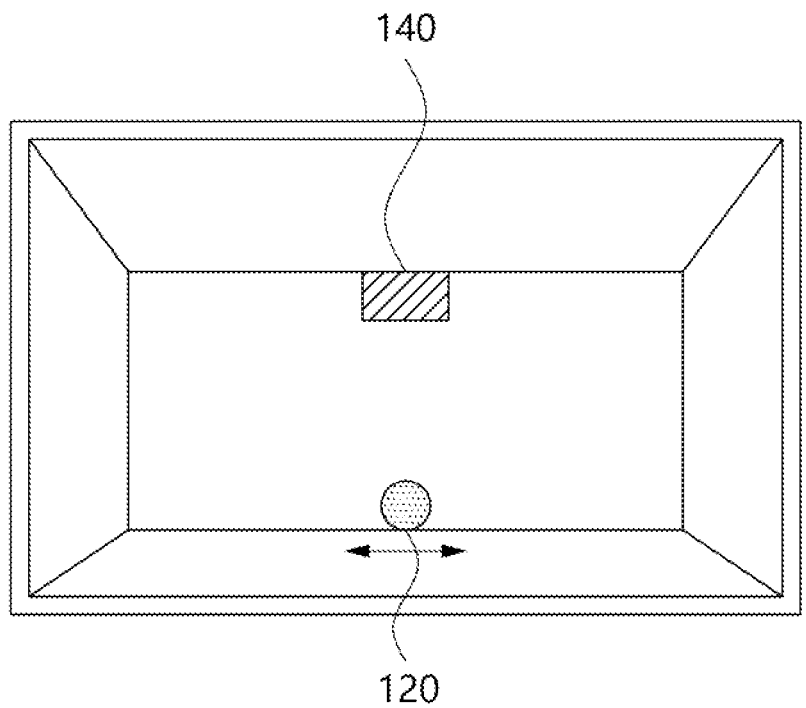

Referring to FIG. 5B, according to yet another embodiment, the lighting unit 120 may be installed to be movable in the image scanning device. The movable lighting unit 120 may be moved according to a signal input to the sensor unit 140 by the control unit 100 and may irradiate the object O with light.

Hereinafter, for convenience of description, the lighting units 120 will be described as including two lighting devices and the two lighting devices will be described as irradiating the regions symmetrical to each other with respect to the sensor unit 140 with the light.

2. Avoiding of Light-Saturated Image 2.1 Control of the Lighting Unit 120

In order to avoid a light saturation phenomenon that may occur in the image of the object O acquired by the sensor unit 140, the control unit 100 may input a lighting control signal to the lighting unit 120 so that the lighting unit 120 sequentially irradiates the object O with light.

Figure 6:
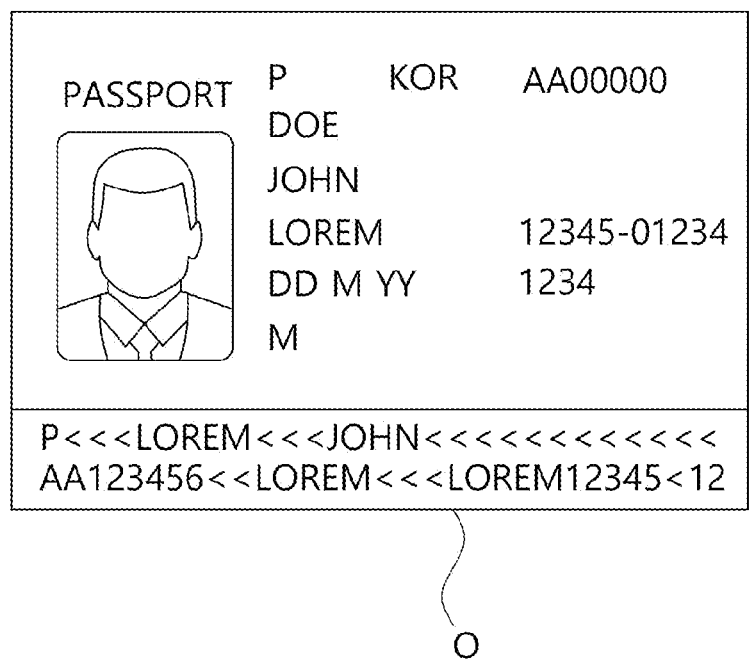
FIGS. 6 to 8 are diagrams illustrating an image of an object (O) and images of the object (O) acquired when a light saturation phenomenon occurs according to an embodiment.
Figure 7:
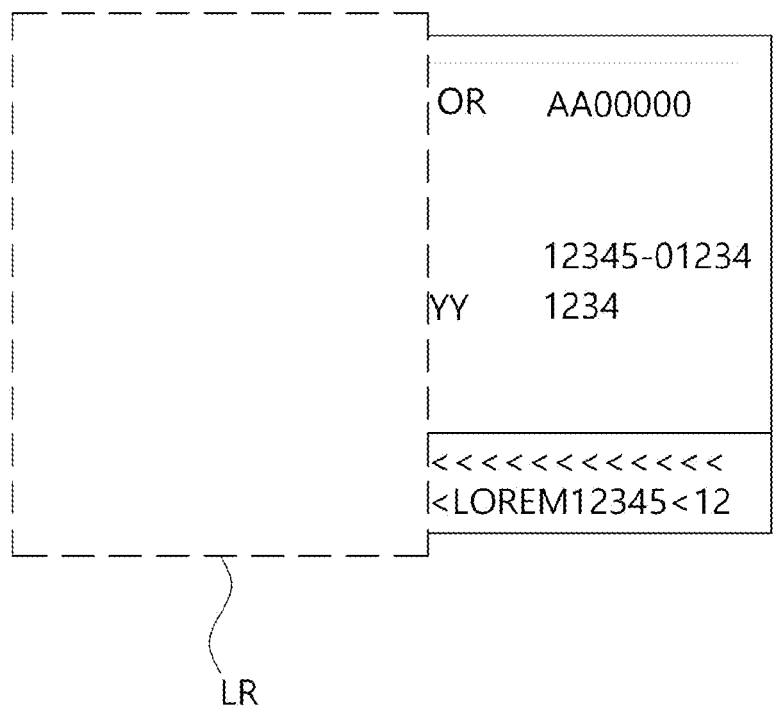
Figure 8:
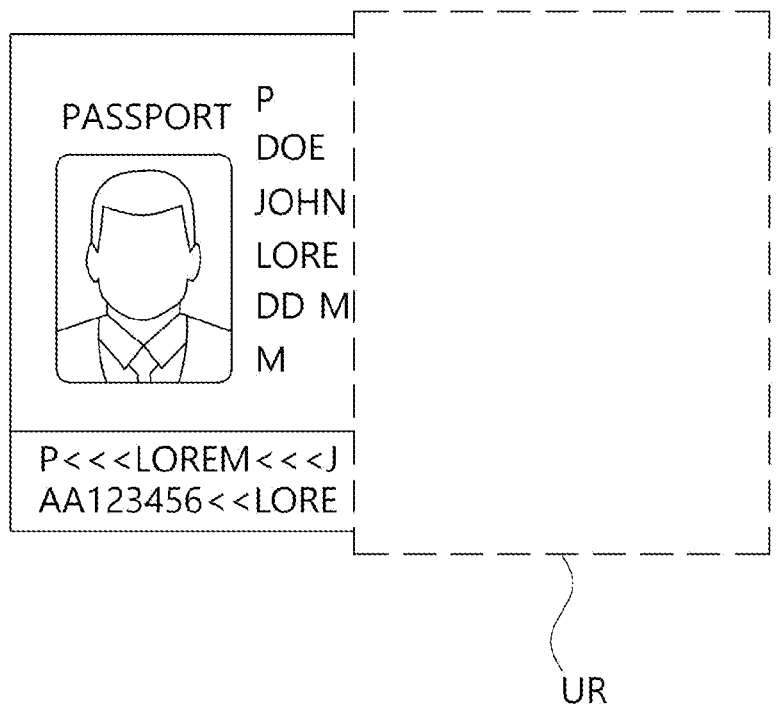

FIGS. 6 to 8 are diagrams illustrating an image of an object O and images of the object O acquired when a light saturation phenomenon occurs according to an embodiment.

Specifically, FIG. 6 is a diagram illustrating an image of an object O to be acquired, FIG. 7 is a diagram illustrating an image of the object O acquired by the sensor unit 140 when the first lighting device 122 irradiates the object O with light, and FIG. 8 is a diagram illustrating an image of the object O acquired by the sensor unit 140 when the second lighting device 124 irradiates the object O with light.

Referring to FIGS. 6 to 8, light saturated regions may be generated in the image of the object O to be acquired when the lighting units 120 irradiate the object O with light.

For example, referring to FIGS. 6 and 7, when the first lighting device 122 irradiates the object O with the light, the sensor unit 140 may acquire an image in a state in which some regions of the image of the object O are light saturated regions. In other words, the first lighting device 122 may generate light saturated regions in some regions of the image of the object O acquired by the sensor unit 140.

Further, referring to FIGS. 6 and 8, when the second lighting device 124 irradiates the object O with the light, the sensor unit 140 may acquire an image in a state in which some regions of the image of the object O are light saturated regions. In other words, the second lighting device 124 may generate light saturated regions in some regions of the image of the object O acquired by the sensor unit 140.

In this case, the first lighting device 122 and the second lighting device 124 irradiate light to the object O may be different from each other. Accordingly, when each of the first lighting device 122 and the second lighting device 124 irradiates the object O with the light, the image of the object O acquired by the sensor unit 140 may have different light saturated regions. In other words, the first lighting device 122 and the second lighting device 124 may generate the light saturated regions in different regions of the image of the object O acquired by the sensor unit 140.

Here, the light saturation phenomenon may mean that the light intensity value acquired by each pixel of the sensor unit 140 is greater than a maximum light intensity value that may be acquired by the pixel of the sensor unit 140. Specifically, the light intensity value that may be acquired by the pixel of the sensor unit 140 may vary according to the type of image sensor used as the sensor unit 140. For example, when the maximum light intensity value that may be acquired by the pixel of the sensor unit 140 is 5 and the intensity value of light returning from the object O is 10, the intensity value of the light returning from the object O may not be properly acquired by the pixel of the sensor unit 140, and thus some regions of the image generated by the image generating device may have light saturated regions.

Further, the region of the object O in which the light saturated region is not present may be a region (hereinafter, referred to as an effective region) in which the control unit 100 may acquire the image of the object O without distortion. Here, the control unit 100 acquiring the image of the object O without distortion may mean that the control unit 100 may acquire and output the image of the object O without a light saturated region.

That is, in order for the control unit 100 to acquire an identifiable image of the object O, the control unit 100 may acquire the image of the object O without distortion only when the control unit 100 acquires the image of the object O in the effective region other than the light saturated region.

Figure 9:
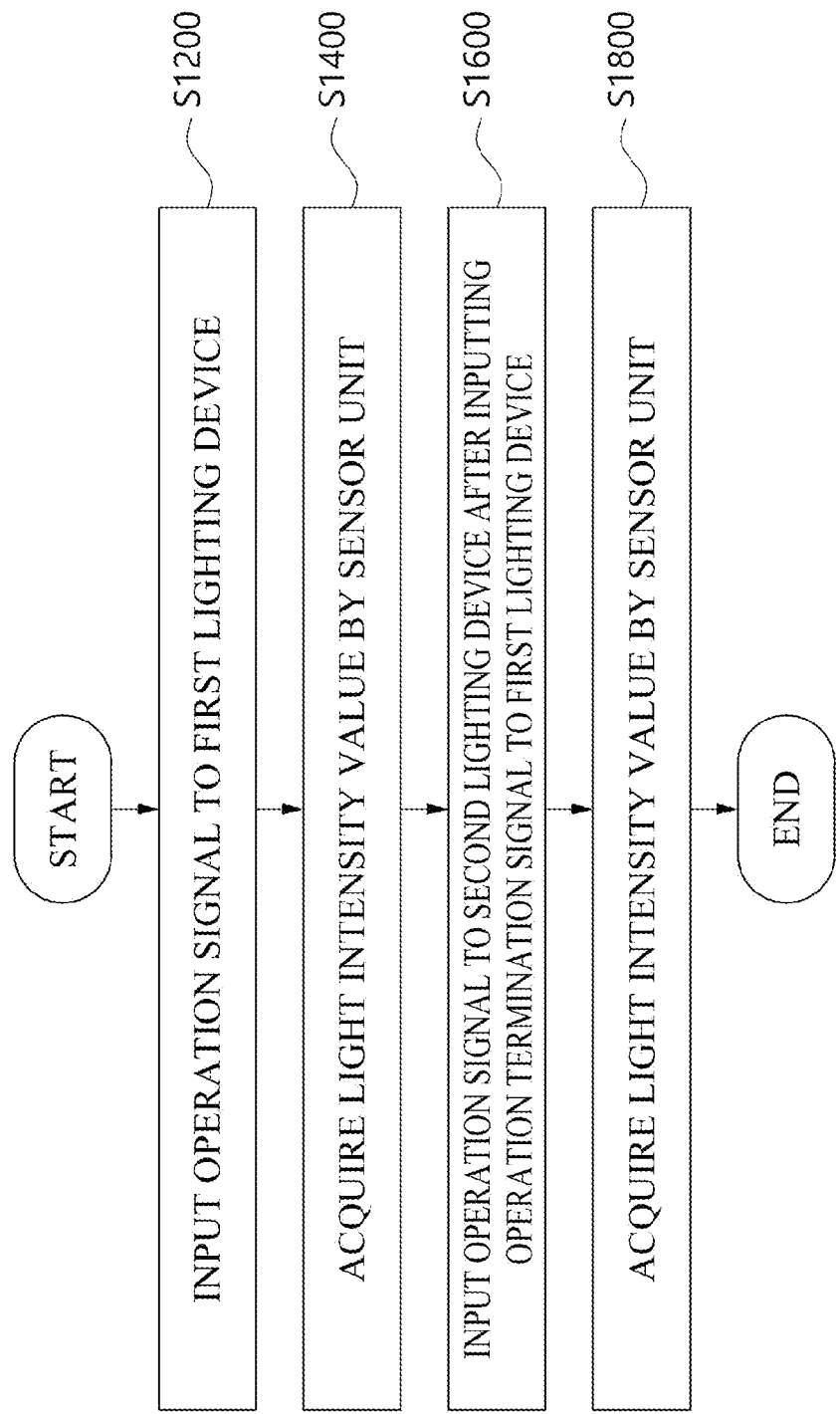
FIG. 9 is a flowchart illustrating a method (S1000) of sequentially controlling lighting units (120) by the control unit (100) according to an embodiment.

FIG. 9 is a flowchart illustrating a method S1000 of sequentially controlling the lighting units 120 by the control unit 100 according to an embodiment.

Referring to FIG. 9, the method S1000 of sequentially controlling the lighting units 120 by the control unit 100 may include an operation S1200 of inputting an operation signal to the first lighting device 122, an operation S1400 of acquiring, by the sensor unit 140, a light intensity value, an operation S1600 of inputting an operation termination signal to the first lighting device 122 and inputting an operation signal to the second lighting device 124, and an operation S1800 of acquiring, by the sensor unit 140, a light intensity value.

The operation S1200 of inputting the operation signal to the first lighting device 122 may include inputting, by the control unit 100, the operation signal to the lighting units 120. Specifically, the lighting unit 120 may include the first lighting device 122 and the second lighting device 124, and the control unit 100 may first input the operation signal to the first lighting device 122 among the first lighting device 122 and the second lighting device 124.

Here, the operation signal refers to a signal input by the control unit 100 so that the lighting unit 120 irradiates the object O with light.

Further, the lighting unit 120 may receive the operation signal from the control unit 100 once in order to irradiate the object O with the light. In this case, in order for the lighting unit 120 to terminate the light irradiation to the object O, the control unit 100 may input the operation termination signal to the lighting unit 120.

Alternatively, the lighting unit 120 may continuously receive the operation signal from the control unit 100 in order to irradiate the object O with the light. In this case, in order for the lighting unit 120 to terminate the light irradiation to the object O, the control unit 100 may stop the inputting of the operation signal to the lighting unit 120. Hereinafter, it is assumed that the control unit 100 stopping the input of the operation signal to the lighting unit 120 means that the control unit 100 inputs the operation termination signal.

When the first lighting device 122 receives the operation signal from the control unit 100, the first lighting device 122 may irradiate the object O with the light. In this case, the light applied to the regions of the object O may have different intensity values for each region. Accordingly, the light returning from the object O may have different intensity values for each region.

The operation S1400 of acquiring, by the sensor unit 140, the light intensity value includes acquiring, by the sensor unit 140, the intensity values of the light returning from the object O. Specifically, the light intensity values of the light returning from the object O may be different for each region of the sensor unit 140.

The operation S1600 of inputting the operation termination signal to the first lighting device 122 and inputting the operation signal to the second lighting device 124 may include inputting, by the control unit 100, a signal that causes the first lighting device 122 to no longer irradiate the object O with the light, terminating the light irradiation to the object O by the first lighting device 122 according to input of the signal, and inputting, by the control unit 100, a signal that causes the second lighting device 124 to irradiate the object O with the light to the second lighting device 124. Hereinafter, like the control unit 100 inputting the operation termination signal to the first lighting device 122 and then inputting the operation signal to the second lighting device 124, the control unit 100 inputting the operation termination signal to some lighting devices of the plurality of lighting devices present in the lighting unit 120 and inputting the operation signal to other lighting devices is expressed as switching the lighting units 120.

Here, the switching the lighting units may occur after the operation S1400 of acquiring, by the sensor unit 140, the light intensity value, but the present invention is not limited thereto, and the switching the lighting units 120 may occur while the sensor unit 140 acquires the light intensity value. That is, the operations of the acquiring of the light intensity value performed before and after the switching the lighting unit may be a continuous operation performed before and after a time point at which the lighting units are switched. In other words, the lighting units 120 may be switched at one of the time points at which the sensor unit 140 continuously acquires the light intensity values.

The switching method will be described in detail in the following related part.

The operation of acquiring the intensity value of the light returning from the object O by the sensor unit 140 described above may be applied to the operation S1800 of acquiring, by the sensor unit 140, the light intensity value.

Additionally, although not illustrated in FIG. 9, the method S1000 may include inputting, by the control unit 100, a signal for terminating the operation of the second lighting device 124 to the lighting unit 120 after the operation of, by the sensor unit 140, acquiring the light intensity value.

2.2 Switching the Lighting Units 120 by the Control Unit 100

As described above, the control unit 100 may sequentially switch the lighting units 120.

That is, when the control unit 100 switches the lighting units 120, the control unit 100 may switch the lighting units 120 according to the time points at which the lighting units 120 are to be switched.

Here, the time points at which the lighting units 120 are to be switched may be determined based on an H-sync or V-sync signal input to the sensor unit 140 by the control unit 100.

Figure 10:
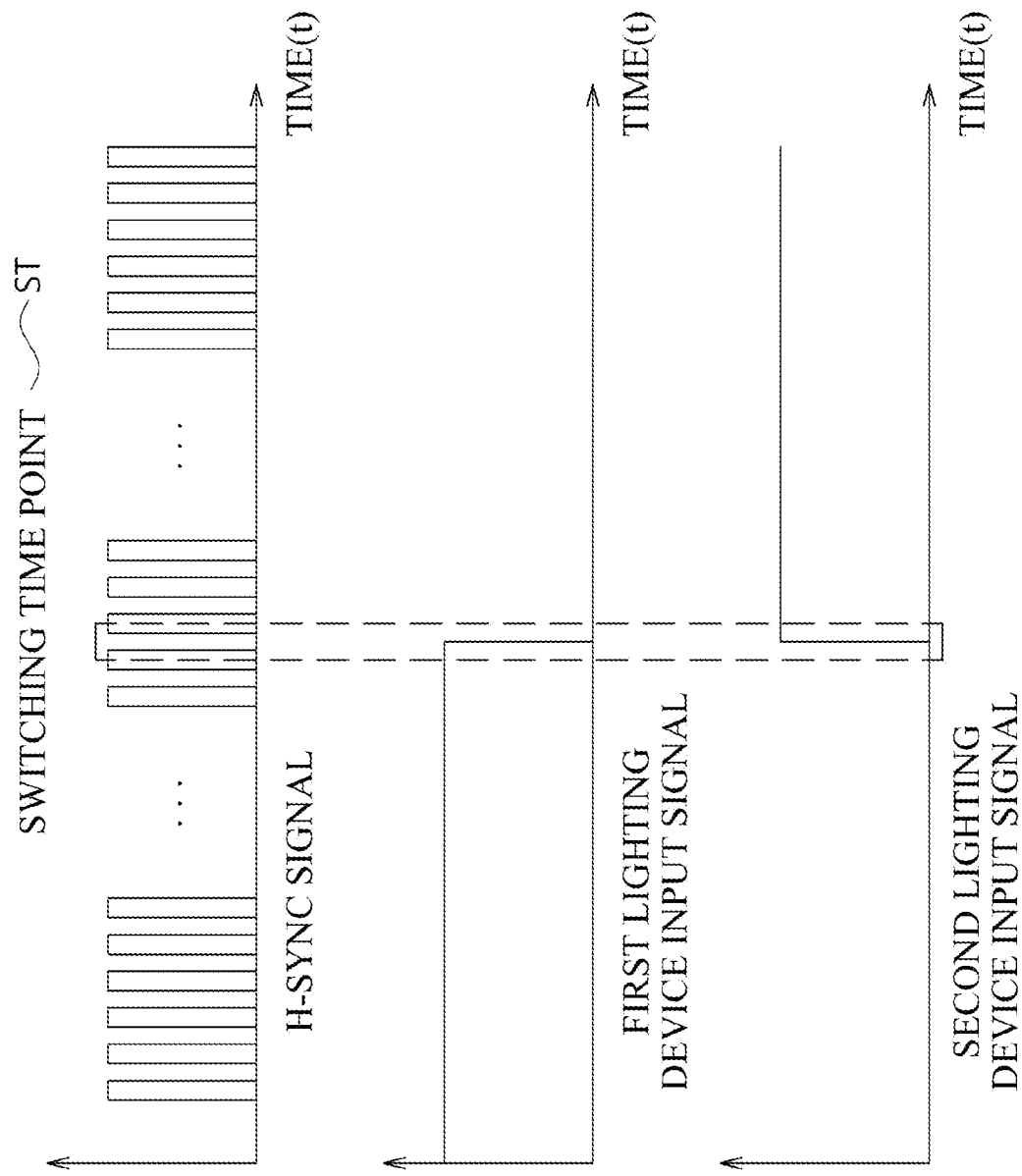
FIG. 10 is a diagram illustrating a correlation between H-sync signals input to the sensor unit (140) and signals input to the lighting unit (120) according to an embodiment.

FIG. 10 is a diagram illustrating a correlation between H-sync signals input to the sensor unit 140 and signals input to the lighting units 120 according to an embodiment In FIG. 10, a horizontal axis of each graph represents time, and a vertical axis represents a numerical value that may identify whether signals including a voltage, a current, and the like are input.

In FIG. 10, each signal in the H-sync signal graph represents one of a first line scan start signal to an $n^{th}$ line scan start signal.

In FIG. 10, the signals input to the first lighting device 122 and the signals input to the second lighting device 124 represent operation signals of the lighting devices input to the lighting device.

Referring to FIG. 10, the control unit 100 may operate the first lighting device 122 and the second lighting device 124 of the lighting units 120 at different time points. Here, the control unit 100 may determine a time point at which the operation signals are switched from the first lighting device 122 to the second lighting device 124 on the basis of the signals input to the sensor unit 140.

Figure 11:
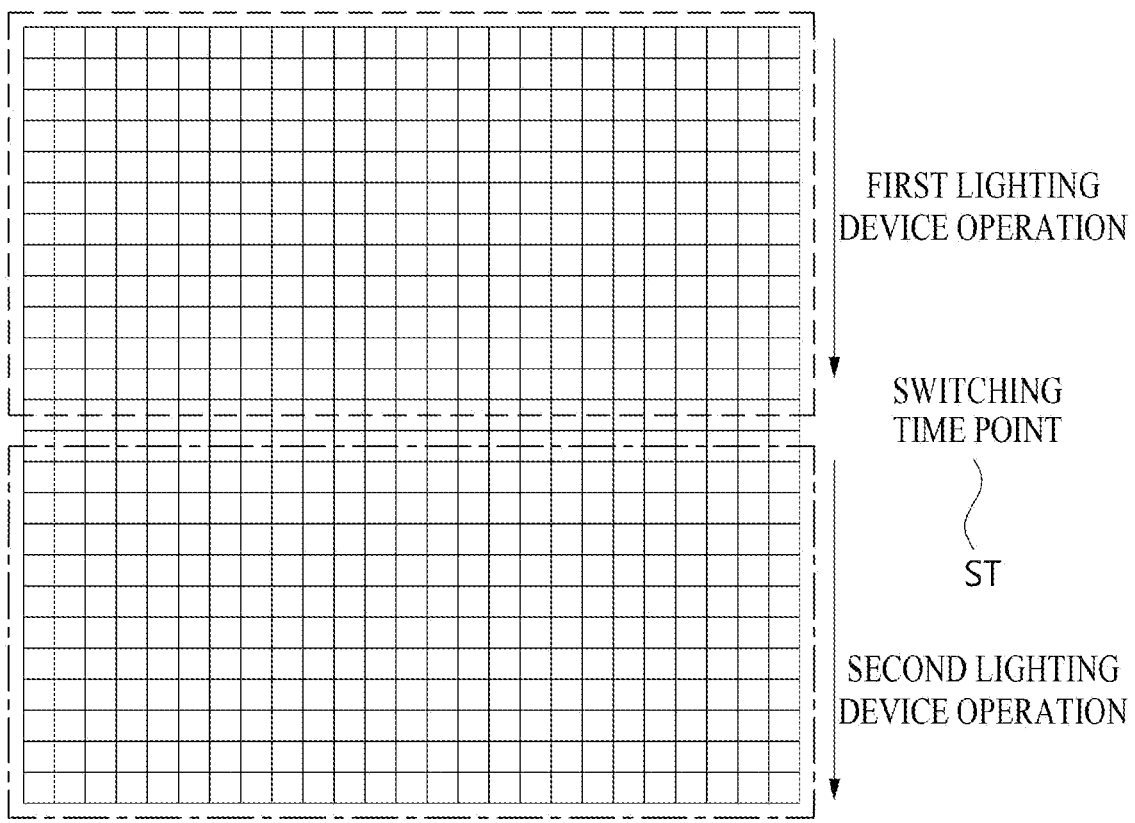
FIG. 11 is a diagram illustrating the operation of the lighting units (120) when the sensor unit (140) acquires the image of the object (O) according to an H-sync signal input according to an embodiment.

FIG. 11 is a diagram illustrating the operation of the lighting units 120 when the sensor unit 140 acquires the image of the object O according to the H-sync signal input according to an embodiment.

FIG. 12 is a diagram illustrating that, in the correlation between the H-sync signal input to the sensor unit 140 and the signal input to the lighting unit 120, the H-sync signal is input but there is no signal which is input to the lighting unit 120 near a switching time point ST according to an embodiment.

According to an embodiment, the switching time point ST at which the control unit 100 switches the operation signals of the lighting devices may be determined by the number of lighting devices. For a more specific example, when the number of lighting devices included in the lighting unit 120 is two, the switching time point ST may be one time point less than the number of lighting devices. In other words, when the sensor unit 140 acquires the image of the object O, in order to acquire the image of the object O only in the effective region of the object O without the light saturated region, the time point at which the control unit 100 switches the first lighting device 122 and the second lighting device 124 may be a time point at which the first lighting device 122 starts to display the light saturated region.

For example, referring to FIG. 7 described above, when the first lighting device 122 of the lighting unit 120 irradiates the object O with the light, the light saturated region may be located in a lower end portion LR of the object O. Here, the lower end portion LR refers to a lower region of the drawing for convenience of description and, on the contrary, an upper end portion UR refers to an upper region of the drawing for convenience of description.

Accordingly, when the first lighting device 122 irradiates the object O with the light, the control unit 100 may acquire an image of the upper end portion UR of the object O in order to acquire the image of the object O.

Further, when the second lighting device 124 irradiates the object O with the light, the control unit 100 may acquire an image of the lower end portion LR of the object O in order to acquire the image of the object O.

More specifically, referring to FIG. 10, in order for the control unit 100 to acquire the image of the upper end portion UR of the object O, the control unit 100 may use the H-sync signal, which is a signal input to the sensor unit 140. As described above, the H-sync signal may include the line scan start signal so that the sensor unit 140 acquires the image of the object O for each line. Here, the operation signal of the lighting unit 120 may be input based on the input of a plurality of lines scan start signals of the H-sync signal.

This means that the operation signals of the lighting devices may be switched when the H-sync signal inputs the line scan start signal for scanning an intermediate portion of the object O.

Specifically, referring to FIG. 11, when a ratio of the light saturated region represented by the first lighting device 122 or the second lighting device 124 to the image of the object O, which is one of the upper end portion of the object O or the lower end portion of the object O, represents a ratio of 50%, the switching time point ST may be a time point at which the line scan start signal for scanning the intermediate portion of the object O among the plurality of line scan start signals included in the H-sync signal is input to the sensor unit 140. That is, when the H-sync signal includes the first line scan start signal to the $n^{th}$ line scan start signal, a time point at which an $(n/2)^{th}$ line scan start signal (n is an even number) or an $((n+1)/2)^{th}$ or $((n-1)/2)^{th}$ line scan start signal (n is odd number), which is the line scan start signal for scanning the intermediate portion of the object O, is input to the sensor unit 140 may be the switching time point ST of the operation signals of the lighting devices.

According to another embodiment, when the number of lighting devices included in the lighting unit 120 is three or more, there may be two or more switching time points ST. More specifically, when the plurality of lighting devices included in the lighting unit 120 irradiate the object O with the light, the light saturated regions which are present in the image of the object O acquired by the sensor unit 140 may correspond to a plurality of different regions. Accordingly, the switching time point ST may be a time point at which each of the lighting devices included in the lighting unit 120 generates the light saturated region. In other words, when there are three lighting devices, the switching time point ST may be a time point at which an $(n/3)^{th}$ line scan start signal (when n/3 is not an integer, it is the nearest integer) of the H-sync signal is input and a time point at which an $(2*n/3)^{th}$ line scan start signal (when 2*n/3 is not an integer, it is the nearest integer) is input. That is, when there are a plurality of lighting devices, the switching time point ST may be present in each of time intervals acquired by dividing the plurality of line scan start signals included in the H-sync signal into time intervals in which the plurality of lighting devices are present.

According to another embodiment, referring to FIG. 12, even when the light saturated region due to the lighting device is not generated, the control unit 100 may switch the operation signals of the lighting devices of the lighting unit 120. This is because, when the control unit 100 inputs the operation signals of the lighting devices to the lighting unit 120, an actual operation time point of the lighting unit 120 may be a time point later than the time point at which the control unit 100 inputs the operation signals of the lighting devices. Therefore, the switching time points ST of the operation signals of the lighting devices may be determined in consideration of the actual operation time point of the lighting device after inputting the operation signals of the lighting devices.

For example, when the lighting unit 120 includes the first lighting device 122 and the second lighting device 124, the control unit 100 may input the H-sync signal to the sensor unit 140 in a state in which the control unit 100 does not input the operation signals of the lighting devices to both of the first lighting device 122 and the second lighting device 124. In other words, the operation signal of the second lighting device 124 is not input immediately after the signal for terminating the operation of the first lighting device 122 is input but may be input after a predetermined time has elapsed.

Accordingly, while the H-sync signal is input to the sensor unit 140, the control unit 100 may not input any lighting device operation signal to the lighting unit 120. In other words, when the sensor unit 140 performs a scan on the object O for each line of the sensor unit 140 on the basis of the H-sync signal, a time point at which the lighting unit 120 does not input any signal from the control unit 100 may be present.

Hereinafter, for convenience of description, it is assumed that the control unit 100 inputs the signal for terminating the operation of the first lighting device 122 to the lighting unit 120 and inputs the operation signal of the second lighting device 124 to the lighting unit 120 at the switching time point ST.

2.3 Controlling the Intensity of Light of the Lighting Unit 120

Figure 13A:
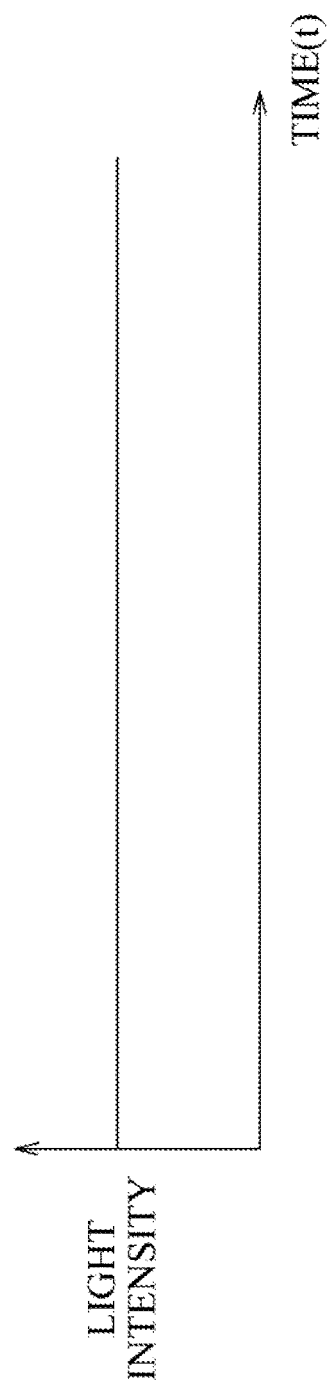
FIG. 13A is a diagram illustrating the intensity of light irradiated by a first lighting device (122) over time according to an embodiment.
Figure 13B:
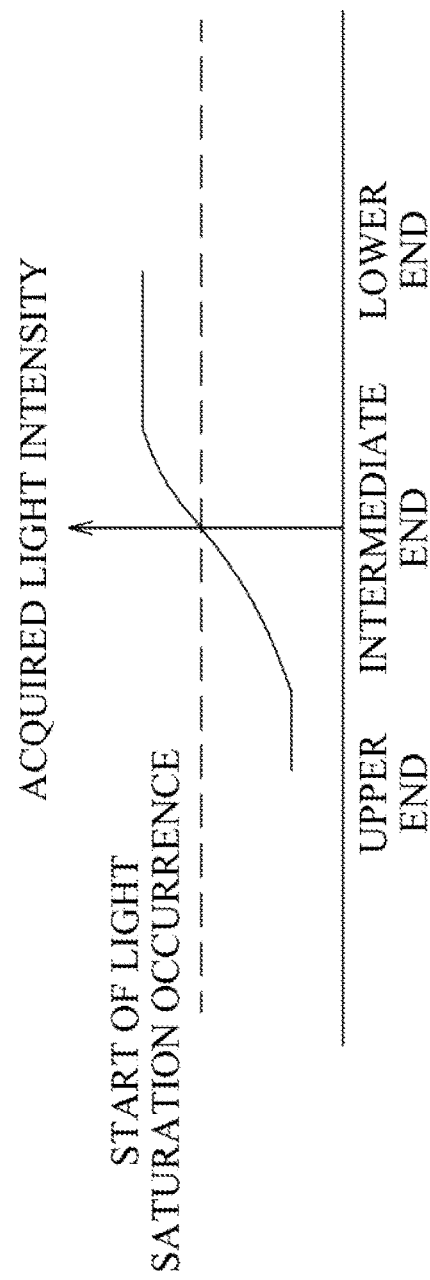
FIG. 13B is a diagram illustrating the intensity of light acquired at each position in the sensor unit (140) when only the first lighting device (122) is operated according to the embodiment.

FIG. 13A is a diagram illustrating the intensity of light irradiated by the first lighting device 122 over time according to an embodiment, and FIG. 13B is a diagram illustrating the intensity of light acquired at each position in the sensor unit 140 when only the first lighting device 122 is operated according to the embodiment.

FIGS. 14A, 14B, 15A and 15B are diagrams illustrating that the sensor unit 140 acquires the image of the object O having a constant light intensity by gradually adjusting the intensity of light irradiated by the lighting unit 120 according to an embodiment.

Figure 14A:
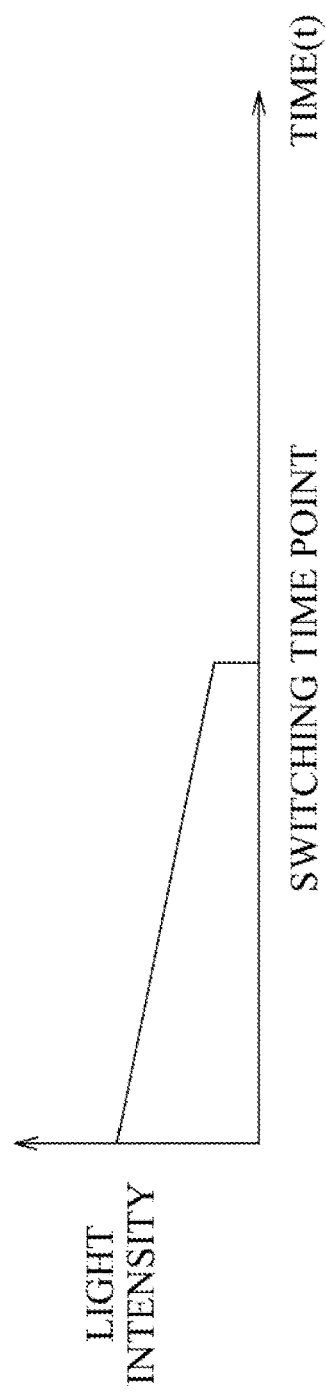
FIGS. 14A, 14B, 15A and 15B are diagrams illustrating that the sensor unit (140) acquires the image of the object (O) having a constant light intensity by gradually adjusting the intensity of light irradiated by the lighting unit (120) according to an embodiment.
Figure 14B:
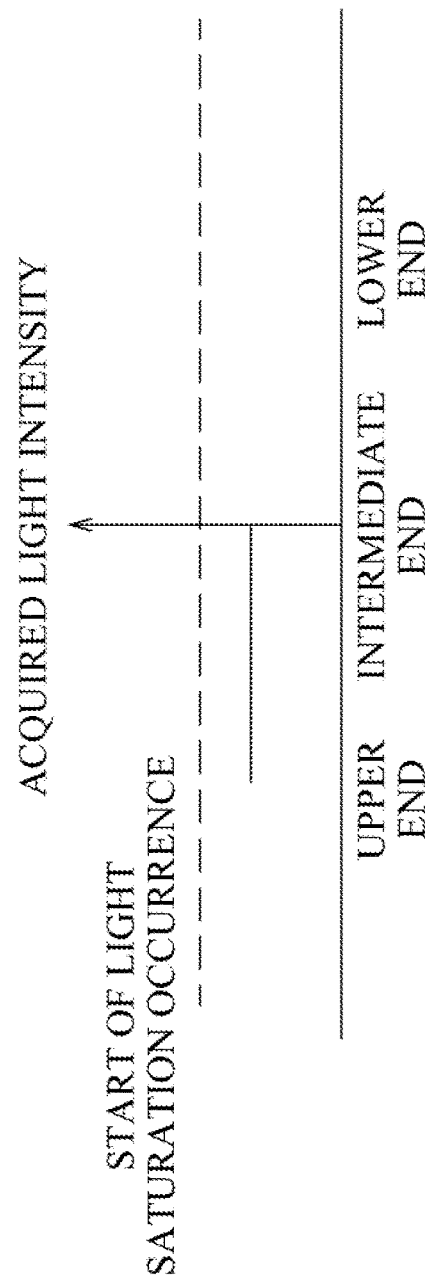

Specifically, FIG. 14A is a graph showing that the intensity of the light applied by the first lighting device 122 gradually and linearly decreases to the switching time point ST according to an embodiment, and FIG. 14B is a graph showing that the light intensity acquired by the sensor unit 140 when the intensity of the light applied by the first lighting device 122 gradually and linearly decreases.

Figure 15A:
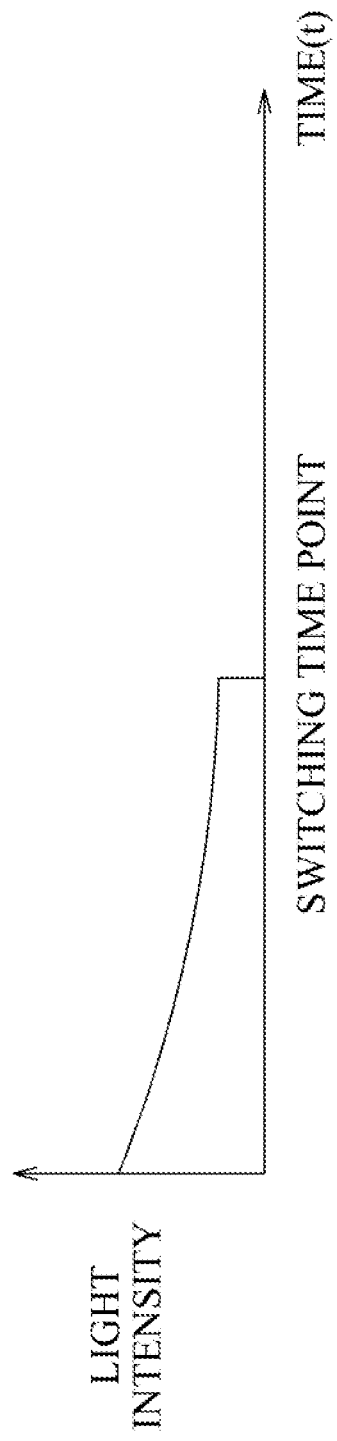
Figure 15B:
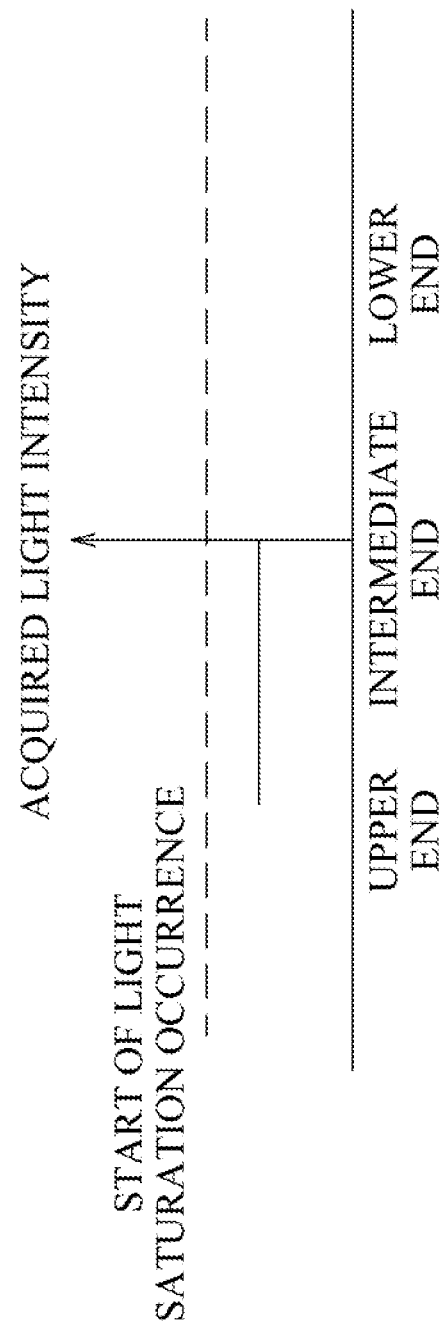

Further, FIG. 15A is a graph showing that the intensity of the light applied by the first lighting device 122 exponentially decreases to the switching time point ST according to an embodiment, and FIG. 15B is a graph showing that the light intensity acquired by the sensor unit 140 when the intensity of the light applied by the first lighting device 122 exponentially decreases.

In FIGS. 13A, 14A, and 15A, a horizontal axis represents time and a vertical axis represents the intensity of light with which the lighting unit 120 irradiates the object O. FIGS. 13B, 14B, and 15B illustrate the light intensity acquired in each region of the image of the object O acquired by the sensor unit 140.

According to an embodiment, referring to FIG. 13B, when only the first lighting device 122 irradiates the object O with the light, the image of the object O acquired by the sensor unit 140 may correspond to a light saturated region from the intermediate end portion MR to the lower end portion LR. As described above, this is because the light intensity acquired by the sensor unit 140 is predetermined so that the intensity of the light may be a constant intensity when the intensity of the light returning from the object O is greater than or equal to a predetermined level.

Further, referring to FIGS. 7 and 13 described above, even when only the first lighting device 122 is operated, the acquired intensity of the light may be increased in a direction from the upper end portion UR toward the intermediate end portion MR of the image of the object O acquired by the sensor unit 140.

Similar to the case in which only the first lighting device 122 irradiates the object O with light, even when only the second lighting device 124 irradiates the object O with light, the image of the object O acquired by the sensor unit 140 may correspond to a light saturated region from the upper end portion UR to the intermediate end portion MR, and the acquired intensity of the light may be increased in a direction from the lower end portion LR toward the intermediate end portion MR.

According to another embodiment, in order to make the acquired intensity of the light constant, the control unit 100 may irradiate the object O with the light by adjusting the intensity of the light when the lighting unit 120 irradiates the object O with the light.

For example, referring to FIG. 14, the lighting unit 120 may linearly decrease the intensity of the light applied to the object O to the switching time point ST. Accordingly, the image of the object O acquired by the sensor unit 140 may exhibit the constant intensity of the light from the upper end portion UR to the intermediate end portion MR of the image. More specifically, when the sensor unit 140 performs a line scan from the upper end portion UR to the lower end portion LR according to the input of the H-sync signal, the lighting unit 120 may linearly decrease the intensity of the light according to an input time of the line scan start signal in order to avoid the light saturated region.

Like the above, although not illustrated in the drawing, the second lighting device 124 may linearly increase the intensity of the light applied to the object O after the switching time point ST. Accordingly, the image of the object O acquired by the sensor unit 140 may exhibit the constant intensity of the light from the intermediate end portion MR to the lower end portion LR of the image.

As another example, referring to FIG. 15, the lighting unit 120 may exponentially decrease the intensity of the light applied to the object O to the switching time point ST. Accordingly, the image of the object O acquired by the sensor unit 140 may exhibit the constant intensity of the light from the upper end portion UR to the intermediate end portion MR of the image. More specifically, when the sensor unit 140 performs a line scan from the upper end portion UR to the lower end portion LR according to the input of the H-sync signal, the lighting unit 120 may exponentially decrease the intensity of the light according to the input time of the line scan start signal in order to avoid the light saturated region.

Like the above, although not illustrated in the drawing, the second lighting device 124 may exponentially increase the intensity of the light applied to the object O after the switching time point ST. Accordingly, the image of the object O acquired by the sensor unit 140 may exhibit the constant intensity of the light from the intermediate end portion MR to the lower end portion LR of the image.

Here, when the lighting unit 120 exponentially increases or decreases the intensity of the light applied to the object O, the exponentially increasing or decreasing includes increasing or decreasing the intensity of the light according to an exponential function or includes increasing or decreasing the intensity of the light in each region acquired by the sensor unit 140 when the lighting unit 120 irradiates the object O with the light with the constant intensity of the light. That is, the meaning of exponential does not mean only a simple exponential function but may mean increasing or decreasing in a non-linear form.

In the above examples, the lighting unit 120 is described as gradually changing the intensity of the light applied to the object O, but the present invention is not limited thereto, and it is also possible for the control unit 100 to gradually control the signal input to the lighting unit 120 so that the lighting unit 120 gradually changes the intensity of the light.

2.3 Control of Acquired Light Intensity of the Control Unit 100

In addition to the acquisition of the image of the object O by adjusting the intensity of the light applied to the object O by the lighting unit 120, the control unit 100 may also adjust the intensity of the light returning from the object O acquired by the sensor unit 140.

Figure 16:
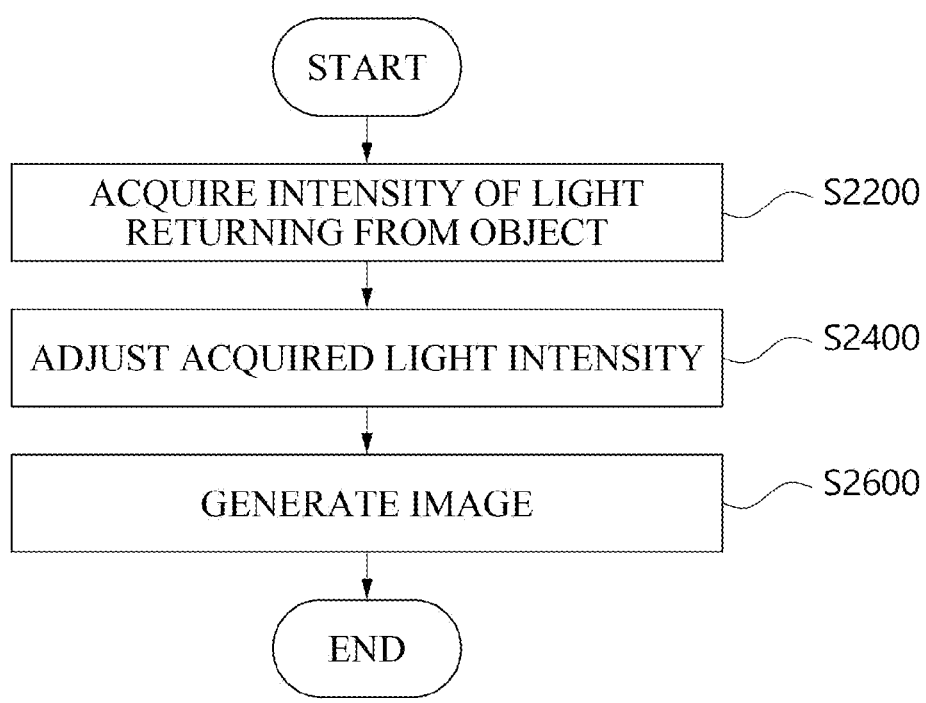
FIG. 16 is a flowchart illustrating a process in which the control unit (100) adjusts the intensity of light of the image of the object (O) acquired by the sensor unit (140) according to an embodiment.

FIG. 16 is a flowchart illustrating a process in which the control unit 100 adjusts the intensity of light of the image of the object O acquired by the sensor unit 140 according to an embodiment.

Referring to FIG. 16, the adjusting, by the control unit 100, the intensity of the light of the image of the object O acquired by the sensor unit 140 may include acquiring, by the sensor unit 140, the intensity of light returning from the object O, adjusting, by the control unit 100, the acquired intensity of the light, and generating, by the control unit 100, an image of the object O.

Referring to FIG. 16, the acquiring of, by the sensor unit 140, the intensity of the light returning from the object O includes inputting, by the control unit 100, the H-sync signal to the sensor unit 140 as described above and, accordingly, acquiring, by the sensor unit 140, the intensity of the light returning from the object O for each line of the sensor unit 140.

Referring to FIG. 16, the adjusting of, by the control unit 100, the intensity of the light acquired from the sensor unit 140 may include increasing or decreasing the light intensity of the light acquired by the control unit 100.

According to an embodiment, the control unit 100 may adjust the intensity of the light acquired from the sensor unit 140 uniformly over all the regions or differently for each region so that the acquired image of the object O may exhibit the intensity of the light substantially uniformly over all the regions.

For example, when the first lighting device 122 and the second lighting device 124 irradiate the object O with light having a constant intensity, a light intensity value of the object O acquired by the sensor unit 140 may be increased in a direction toward the intermediate end portion MR of the sensor unit 140, and thus the control unit 100 may adjust the intensity of the light acquired in the intermediate end portion MR of the sensor unit 140 to be lowered.

Here, the control unit 100 may gradually adjust the intensity of the light acquired in the intermediate end portion MR of the sensor unit 140 to be lowered, similar to the control of the lighting unit 120 described above. Specifically, the control unit 100 may change the intensity of the light acquired from the sensor unit 140 from a region corresponding to the upper end portion UR to a region corresponding to the intermediate end portion MR of the sensor unit 140. In this case, a degree to which the control unit 100 changes the intensity of the light may be linearly or exponentially increased from the region corresponding to the upper end portion UR to the region corresponding to the intermediate end portion MR of the sensor unit 140. In addition, the control unit 100 may change the intensity of the light acquired from the sensor unit 140 from the region corresponding to the lower end portion LR to the region corresponding to the intermediate end portion MR of the sensor unit 140. In this case, a degree to which the control unit 100 changes the intensity of the light may be linearly or exponentially increased from the region corresponding to the lower end portion LR to the region corresponding to the intermediate end portion MR of the sensor unit 140.

Here, the degree to which the control unit 100 changes the intensity of the light is linearly or exponentially changed as described above.

As another example, the control unit 100 may adjust the intensity of the light acquired from the sensor unit 140 to be increased. This is because, when the control unit 100 generates the image according to the intensity of the light acquired from the sensor unit 140, it may not be possible to sufficiently identify the image.

Accordingly, the control unit 100 may adjust the overall intensity of the light acquired from the sensor unit 140 to be increased or adjust the intensity of the light for each region to be increased differently. Here, adjusting the intensity of the light for each region to be different may include adjusting the intensity of the light for each region to be linearly or exponentially increased, as described above.

As another example, the control unit 100 may adjust the intensity of the light acquired from the sensor unit 140 in some regions to be increased and adjust the intensity of the light in other regions to be decreased. More specifically, the control unit 100 may adjust the intensity of the light in the regions corresponding to the upper end portion UR and the lower end portion LR of the sensor unit 140 to be increased and adjust the intensity of the light in the region corresponding to the intermediate end portion MR of the sensor unit 140 to be decreased.

Referring to FIG. 16, the generating of, by the control unit 100, the image includes generating, by the control unit 100, the image by using the intensity of the light which is acquired by adjusting the intensity of the light acquired from the sensor unit 140 overall and/or for each region, as described above.

Further, although not illustrated in the drawing, the control unit 100 may output the generated image using an output device.

According to another embodiment, the control unit 100 may detect only the region in which the light saturated region is present and then cause the sensor unit 140 to scan only the corresponding region. Accordingly, the control unit 100 may synthesize the acquired corresponding regions without the light saturated region in the operation of generating the image.

Here, the detecting of, by the control unit 100, the region in which the light saturated region is present, may refer to detecting a region in which all of RGB signal values of the light intensity acquired by the sensor unit 140 are higher than or equal to a predetermined level.

Figure 17:
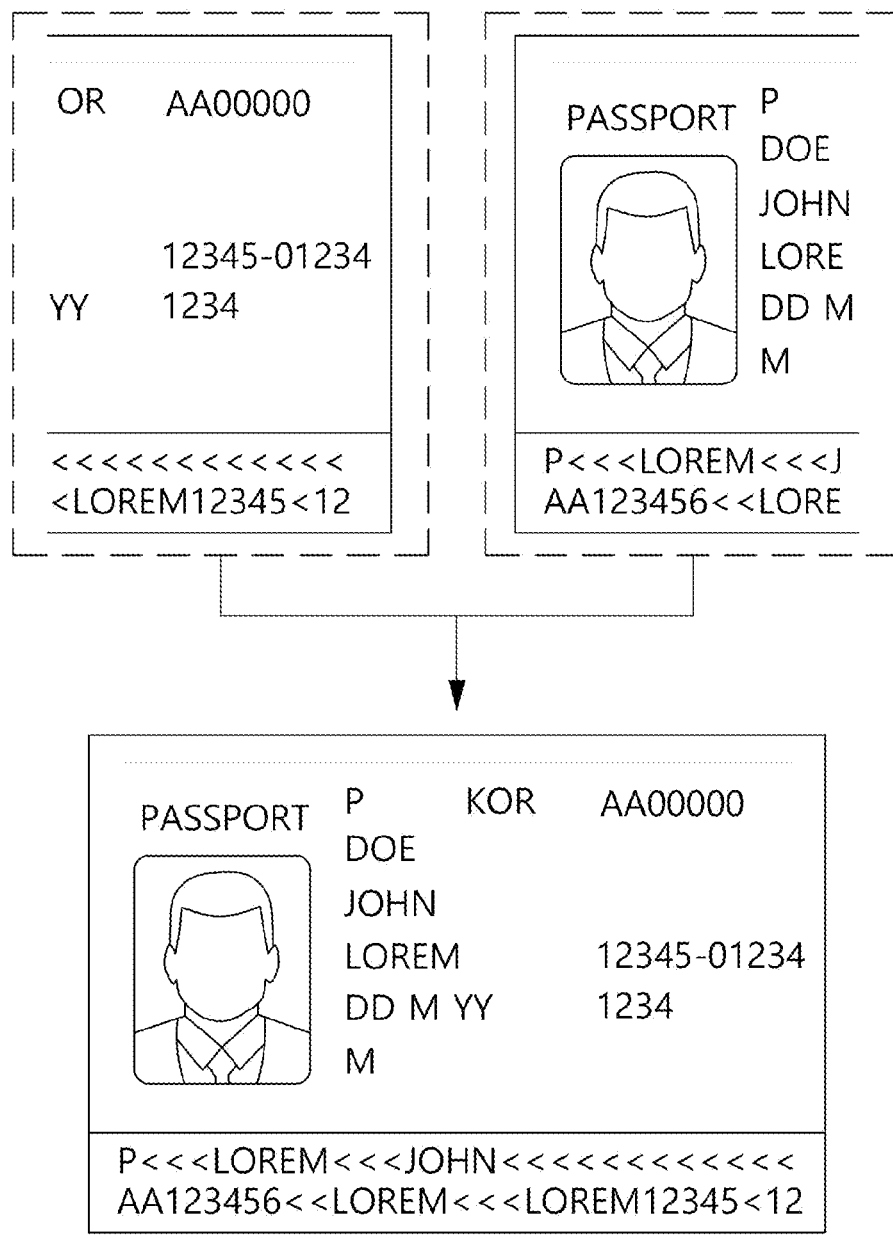
FIG. 17 is a diagram illustrating that the control unit (100) acquires one image by acquiring only an effective region of a scanned image without switching lighting units (120) according to an embodiment.

FIG. 17 is a diagram illustrating that the control unit 100 acquires one image by acquiring only an effective region of the scanned image without switching the lighting units 120 according to the embodiment.

According to an embodiment, the control unit 100 may acquire and synthesize an effective region of the scanned image after operating only the first lighting device 122 and an effective region of the scanned image after operating only the second lighting device 124 in order to avoid the light saturated region on the acquired image.

For example, referring to FIG. 17, the control unit 100 may acquire the effective regions of the image in which the light saturated regions appear and then synthesize the effective regions to acquire a single entire image. In other words, the control unit 100 may cause different lighting devices to irradiate the object O with light and thus perform a plurality of scans using the sensor unit 140. Accordingly, the control unit 100 may acquire and synthesize only the effective regions of the image acquired as a result of each scan.

As another example, when the control unit 100 acquires the effective regions and synthesizes the image, the control unit 100 may adjust the intensity of the light of the effective regions. Here, the adjusting of the intensity of the light of the effective regions may refer to adjusting the entire intensity of the light or adjusting the intensity of the light for each region with different amounts of changes. The adjusting of the intensity of the light of the effective regions is the same as described above.

The method according to the embodiment may be implemented in the form of program instructions that can be performed through various computer units and recorded on computer readable media. The computer readable media may include a program instruction, a data file, a data structure, or combinations thereof. The program instruction recorded on the computer readable media may be specially designed and prepared for the embodiments of the invention or may be an available well-known instruction for those skilled in the field of computer software. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a read only memory (ROM), a random access memory (RAM), or a flash memory, that is specially made to store and perform the program instruction. Examples of the program instruction include a machine code generated by a compiler and a high-level language code that can be executed in a computer using an interpreter and the like. The hardware device may be configured as at least one software module in order to perform operations of embodiments of the present invention and vice versa.

According to an embodiment of the present invention, an image of an object in which a light saturated region is not generated can be acquired by an image generating device using lighting control.

According to another embodiment of the present invention, an image of an object having substantially constant light intensity values in all regions of the image can be acquired by an image generating device using lighting control.

Effects of the present invention are not limited to the above-described effects and other unmentioned effects may be clearly understood by those skilled in the art from this specification and the accompanying drawings.

As described above, while the embodiments have been described with reference to specific embodiments and drawings, various modifications and alterations may be made by those skilled in the art from the above description. For example, when the described technologies are performed in orders different from the described methods, and/or the described components such as a system, a structure, a device and a circuit are coupled or combined in the form different from the described method, or replaced or substituted with other components or equivalents, the appropriate result may be achieved.

Therefore, other implementations, other embodiments, and equivalents within the scope of the appended claims are included in the range of the claims to be described.

The invention claimed is:

1. An image generating device comprising:
an irradiation unit configured to irradiate an object;
a light receiving unit configured to receive light returning from the object; and
a control unit configured to generate a light irradiation signal for controlling the irradiation unit and a light-receiving region driving signal for controlling the light receiving unit,
wherein the irradiation unit includes a first irradiation unit for irradiating a first region of the object with light and a second irradiation unit for irradiating a second region of the object with light,
wherein the light irradiation signal includes a first light irradiation signal for controlling the first irradiation unit and a second light irradiation signal for controlling the second irradiation unit,
wherein the control unit is configured to:
control the first light irradiation signal and the second light irradiation signal so as to prevent a light saturation phenomenon from occurring in the light receiving unit caused by the driving of the irradiation unit,
sequentially perform a first operation of inputting the first light irradiation signal to the first irradiation unit and a second operation of inputting the second irradiation signal to the second irradiation unit,
switch from the first operation to the second operation at a predetermined time point,
control the light-receiving region driving signal so that receiving of the light intensity value begins at a first time point by the light receiving unit and the receiving of the light intensity value stops at a second time point, and
generate an image based on the light received by the light receiving unit between the first time point and the second time point,
wherein the first irradiation unit gradually decreases an intensity of the light irradiated to the object; and
wherein the second irradiation unit gradually increases an intensity of the light irradiated to the object.

2. The image generating device of claim 1, wherein the predetermined time point is earlier than the time point at which a light saturated region occurs in at least a part of the object.

3. The image generating device of claim 1, wherein the predetermined time point is earlier than the time point at which the light receiving unit begins to obtain the light irradiated to a light saturated region generated in at least a part of the object.

4. The image generating device of claim 3, wherein the first irradiation unit irradiates the light to the light saturated region generated in at least a part of the object.

5. The image generating device of claim 1, wherein the predetermined time point is determined based on a position of a light saturated region generated in at least a part of the object.

6. The image generating device of claim 1, wherein the predetermined time point is determined based on a position of at least one of the first irradiation unit and the second irradiation unit.

7. The image generating device of claim 1, wherein the position of the first irradiation unit and the second irradiation unit is determined based on the position of the light receiving unit in the image generating device.

8. The image generating device of claim 1, wherein the second light irradiation signal is input to the second irradiation unit after the first light irradiation signal is input to the first irradiation unit.

9. The image generating device of claim 1, wherein the first irradiation unit linearly decreases the intensity of the irradiated light; and wherein the second irradiation unit linearly increases the intensity of the irradiated light.

10. The image generating device of claim 1, wherein the first irradiation unit exponentially decreases the intensity of the irradiated light; and wherein the second irradiation unit exponentially increases the intensity of the irradiated light.

11. An image generation method comprising:
irradiating, by an irradiation unit, an object;
receiving, by a light receiving unit, light returning from the object; and
generating, by a control unit, a light irradiation signal for controlling the irradiation unit and a light-receiving region driving signal for controlling the light receiving unit,
wherein the irradiation unit includes a first irradiation unit for irradiating a first region of the object with light and a second irradiation unit for irradiating a second region of the object with light,
wherein the light irradiation signal includes a first light irradiation signal for controlling the first irradiation unit and a second light irradiation signal for controlling the second irradiation unit,
wherein the control unit is configured to:
control the first light irradiation signal and the second light irradiation signal so as to prevent a light saturation phenomenon from occurring in the light receiving unit caused by the driving of the irradiation unit,
sequentially perform a first operation of inputting the first light irradiation signal to the first irradiation unit and a second operation of inputting the second irradiation signal to the second irradiation unit, and
switch from the first operation to the second operation at a predetermined time point,
control the light-receiving region driving signal so that receiving of the light intensity value begins at a first time point by the light receiving unit and the receiving of the light intensity value stops at a second time point, and
generate an image based on the light received by the light receiving unit between the first time point and the second time point,
wherein the first irradiation unit gradually decreases an intensity of the light irradiated to the object; and wherein the second irradiation unit gradually increases an intensity of the light irradiated to the object.

* * * * *